Figure 1:
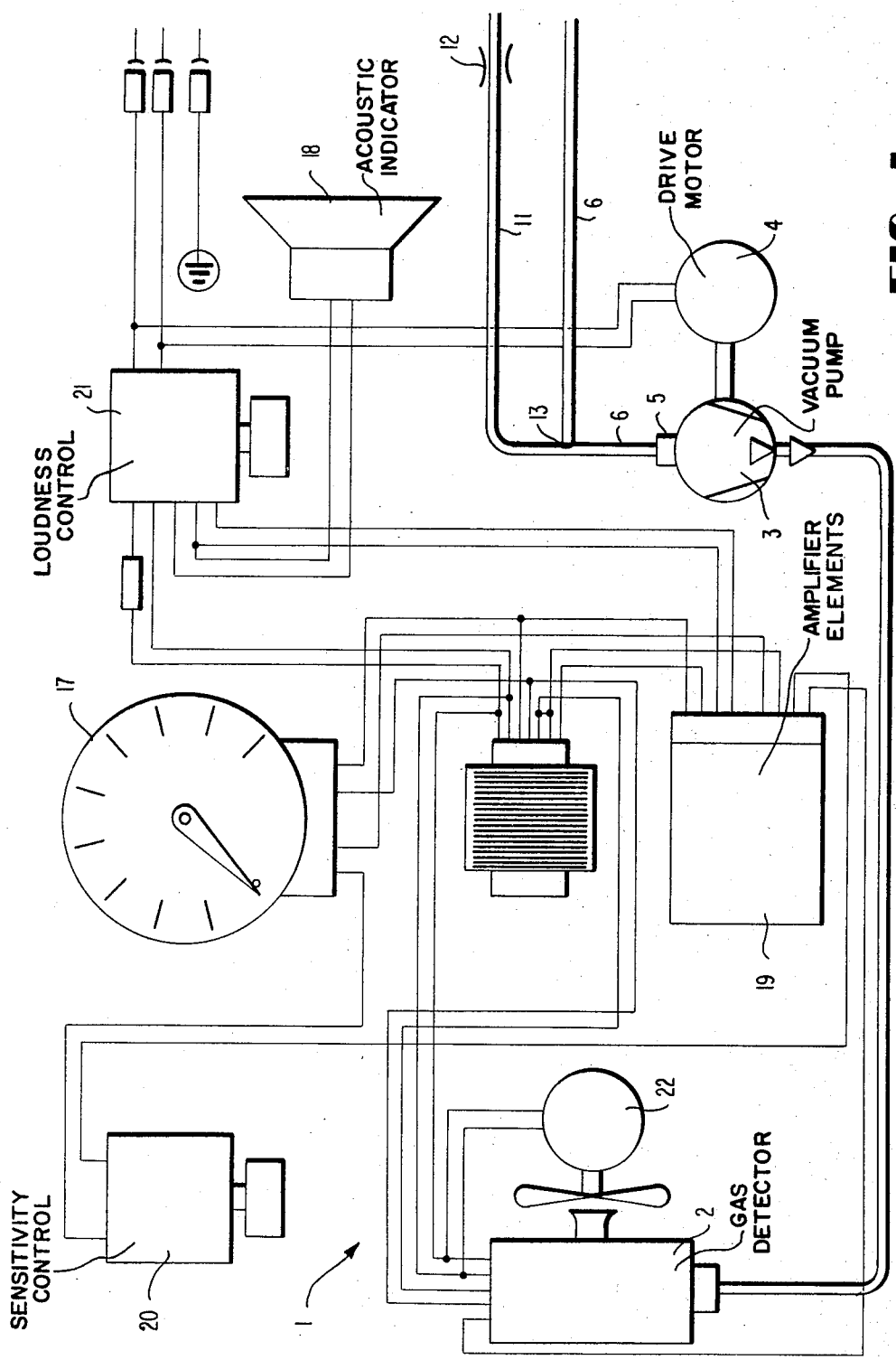

United States Patent [19]
Andres et al.

[11] 3,820,382
[45] June 28, 1974

[54] METHOD AND APPARATUS FOR DETECTING LEAKAGES IN THE VACUUM SYSTEM OF MOTOR VEHICLES

[75] Inventors: Rudolf Andres, Sindelfingen; Hermann Moller, Aidlingen; Franz Seyfried, Sindelfingen, all of Germany

[73] Assignee: Daimler-Benz Aktiengesellschaft, Stuttgart-Unterturkheim, Germany

[22] Filed: Nov. 4, 1971

[21] Appl. No.: 195,671

[30] Foreign Application Priority Data
Nov. 5, 1970 Germany.......................... 2054428

[52] U.S. Cl. ............................. 73/40.7, 116/114 R
[51] Int. Cl. ........................................... G01m 3/04
[58] Field of Search ............ 73/40.7, 49.7, 47, 49.3, 73/116, 117, 119; 116/117, 114 R

[56] References Cited
UNITED STATES PATENTS
2,504,530   4/1950   Jacobs ................................ 73/40.7

*Primary Examiner*—Louis J. Capozi
*Attorney, Agent, or Firm*—Craig and Antonelli

[57] ABSTRACT

A method and apparatus for detecting leakages in the vacuum system especially of motor vehicles, according to which air is sucked out of the vacuum system and fed to a leak detector apparatus which detects the slightest traces of a test gas, externally charged into the surroundings of the place of the vacuum system where the leak is suspected.

6 Claims, 2 Drawing Figures

METHOD AND APPARATUS FOR DETECTING LEAKAGES IN THE VACUUM SYSTEM OF MOTOR VEHICLES

The present invention relates to a method and apparatus for detecting leakages in the vacuum system in preferably motor vehicles.

The detecting or finding of such defects by means of a manometer is very difficult and requires a large amount of time because the lines accommodated in the motor vehicle, the branch lines thereof, the adjusting elements, the distributor members, etc., are not easily accessible.

Known leakage-detecting means with the use of compressed air, colored air or liquid do not lead to the necessary success in a vacuum installation.

In order to eliminate the aforementioned disadvantages, the present invention is concerned with the task to take measures which assure a rapid and careful detection of leakages in the vacuum system.

The problems underlying the present invention are solved in that air is sucked out of the vacuum system and is fed to a leakage detector apparatus and in that the surroundings of that place of the vacuum system where a leak is suspected, is externally charged with a test gas, for example, freon.

In order to be able to realize this, the present invention provides that a vacuum pump is arranged between the vacuum system and the leakage detector apparatus.

As a further feature of the present invention, a throttle opening may be provided between the vacuum system and the vacuum pump for the admission of atmospheric air.

Accordingly, it is an object of the present invention to provide a method and apparatus for detecting leakages in vacuum systems of motor vehicles which avoids by simple means the aforementioned shortcomings and drawbacks encountered in the prior art.

Another object of the present invention resides in a method and apparatus for detecting leakages in vacuum systems which permits a rapid and careful detection of any leakages without large amounts of time required therefor.

A further object of the present invention resides in a method and apparatus for detecting leakages in the vacuum system of motor vehicles which is easy to carry out and assures accurate results.

Figure 2:
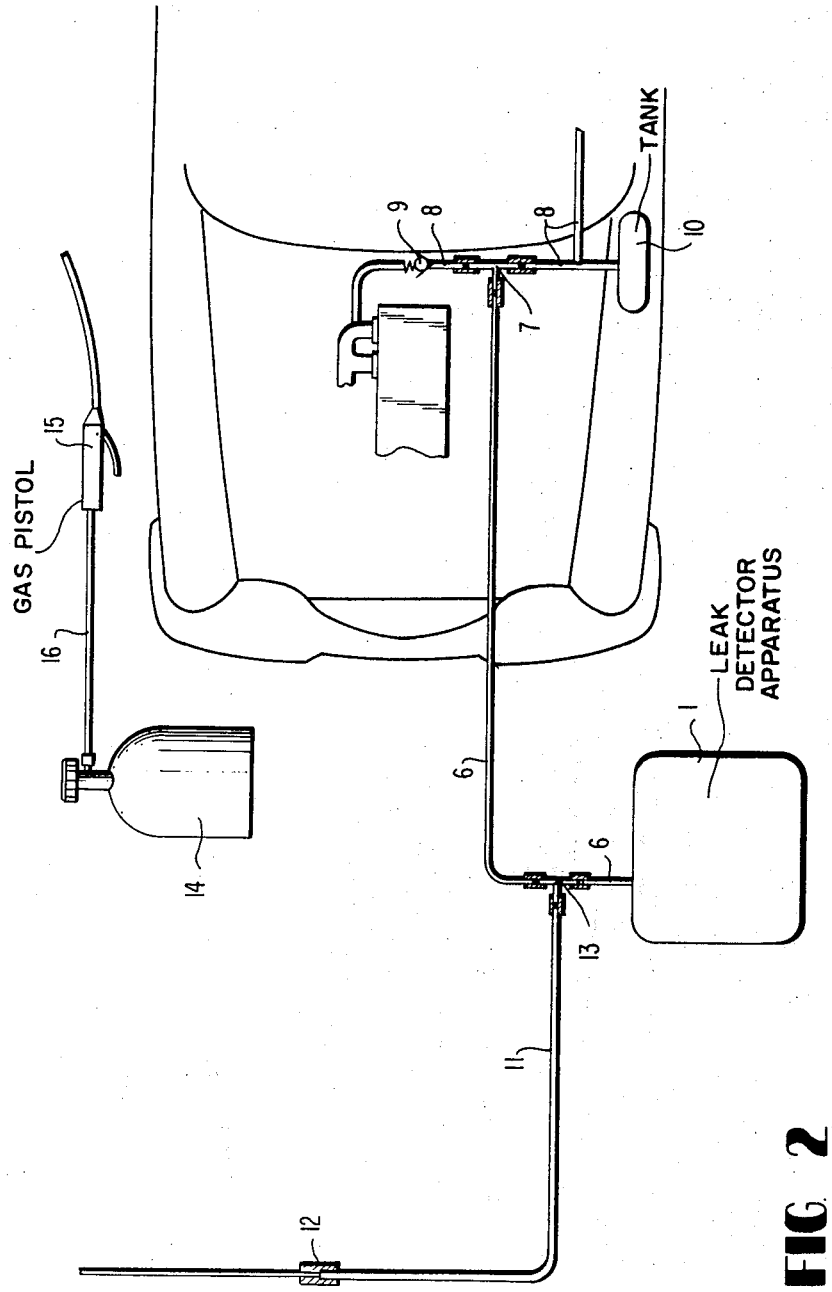

These and further objects, features, and advantages of the present invention will become more apparent from the following description when taken in connection with the accompanying drawing which shows, for purposes of illustration only, one embodiment in accordance with the present invention, and wherein:

FIG. 1 is a schematic view of the leakage detector apparatus in accordance with the present invention; and FIG. 2 is a somewhat schematic view illustrating the use of a leakage detector apparatus in accordance with the present invention connected to the vacuum system of a motor vehicle.

Referring now to the drawing wherein like reference numerals are used throughout the two views to designate like parts and more particularly to FIG. 1, a leakage detector apparatus generally designated by reference numeral 1 which is connected to the vacuum system of a motor vehicle, essentially consists of a conventional sensitive gas detecting element 2 such as disclosed, for example, in U.S. Pat. Nos. 3,076,139, 3,363,451, and 3,070,992, responsive to the slightest traces of the test gas, for example, freon. A vacuum pump 3 with electric drive motor 4 is connected upstream of this sensitive gas detecting element 2 which are all of conventional construction and therefore not described and illustrated in detail.

The suction line 6 (FIGS. 1 and 2), leading to the suction connection 5 (FIG. 1) of the vacuum pump 3 is connected to a T-shaped connecting member 7 of a vacuum line 8 of the vacuum system (as can be readily seen from FIG. 2) whereby the connecting member 7 is arranged with its long leg thereof extending in the same axial direction in the vacuum line 8 between a check valve 9 and a reservoir or tank 10.

A cooling air line 11 provided for the cooling of the sensitive element 2, which includes at its free end a throttle 12, is connected with the suction line 6 at a place 13 located in proximity to the leak detector apparatus 1.

In order to detect any leakage in the vacuum system, which is suspected at any place in the motor vehicle, the surroundings of this place are charged or contaminated with the test gas. This takes place by means of a gas bottle 14 (FIG. 2) and a hose 16 provided with a conventional gas pistol 15 such as disclosed, for example, in U.S. Pat. No. 3,599,876, which is introduced, for example, through a gap or clip openings into the interior of a motor vehicle door. If a part of the system built into the door is untight, out of this contaminated space the test gas is sucked in by way of the leakage place by the vacuum pump 3 and is fed to the sensitive element 2 which responds to the slightest traces of test gas and transmits the presence of this test gas to a conventional optical indicator 17 and a conventional acoustic indicator 18 by way of electronic control and amplifier elements 19 connected therebetween (FIG. 1). Since the elements 17, 18 and 19 are also of conventional construction, a detailed description thereof is dispensed with herein.

The sensitivity of the optical indicator 17 is adjusted by means of a sensitivity control device 20 of conventional type and the loudness of the acoustic indicator 18, e.g., a conventional buzzer, is adjustable by way of a conventional loudness control device 21.

The sensitive element 2 which rapidly heats up during the suction operation is cooled, on the one hand, by a fan 22 arranged in the leak detector apparatus 1 and, on the other, by a predetermined proportion of atmospheric air which is sucked in by way of the cooling air line 11. The throttle 12, arranged at the end of the cooling air line 11 is so adjusted that a pressure in the vacuum system can build up of about half the magnitude of the normal air pressure.

In order to assure an accurate indication, the end of the cooling air line is to be so laid out as to be several meters from the vacuum system. Any eventual sucking in of test gas by way of the cooling air line is precluded by this measure.

While we have shown and described only one embodiment in accordance with the present invention, it is understood that the same is not limited thereto but is susceptible of numerous changes and modifications as are known to those skilled in the art, and we therefore do not wish to be limited to the details shown and described herein, but intend to cover all such changes and modifications as are encompassed by the scope of the appended claims.

What we claim is:

1. A method of detecting leaks in a vacuum system comprising the steps of: supplying a test gas to the surroundings of that place of the vacuum system where a leak is suspected; sucking air out of the vacuum system; feeding said sucked air to a leak detector apparatus; and cooling said leak detector apparatus by supplying atmospheric air by way of a throttle opening to said leak detector apparatus whereby traces of said test gas in the vacuum system will be detected by said leak detector apparatus.

2. A method according to claim 1, wherein said test gas is freon.

3. A vacuum system leak detecting arrangement comprising: means for supplying a test gas externally to a suspected location of a leak in the vacuum system; means for sucking the air out of the vacuum system; leak detector means for detecting the presence of a test gas; means for supplying said sucked air to said leak detector means; and means for supplying atmospheric air to said leak detector means whereby said detector means detects the slightest traces of test gas in said air sucked out of said vacuum system including throttle means disposed between the vacuum system and said sucking means for the inlet of atmospheric air to cool said leak detector means.

4. A detecting arrangement according to claim 3, wherein said means for sucking air out of the vacuum system includes a vacuum pump disposed between the vacuum system and said leak detector means.

5. A detecting arrangement according to claim 3, wherein said vacuum system includes the vacuum system of a motor vehicle.

6. A detecting arrangement according to claim 5, wherein said means for supplying a test gas includes a selectively operable means for controlling the flow of the test gas.

* * * * *